(12) United States Patent
Kambara et al.

(10) Patent No.: US 12,447,458 B2
(45) Date of Patent: Oct. 21, 2025

(54) FUEL-REFORMING DEVICE AND FUEL-REFORMING METHOD

(71) Applicants: National University Corporation Tokai National Higher Education and Research System, Aichi (JP); SAWAFUJI ELECTRIC CO., LTD., Gunma (JP)

(72) Inventors: Shinji Kambara, Aichi (JP); Tomonori Miura, Gunma (JP); Yuya Tanaka, Gunma (JP); Tatsuya Ikeda, Gunma (JP)

(73) Assignees: National University Corporation Tokai National Higher Education and Research System, Aichi (JP); SAWAFUJI ELECTRIC CO., LTD., Gunma (JP)

( * ) Notice: Subject to any disclaimer, the term of this patent is extended or adjusted under 35 U.S.C. 154(b) by 0 days.

(21) Appl. No.: 18/596,344

(22) Filed: Mar. 5, 2024

(65) Prior Publication Data
US 2024/0207808 A1    Jun. 27, 2024

Related U.S. Application Data

(63) Continuation of application No. 17/603,891, filed as application No. PCT/JP2020/015914 on Apr. 9, 2020, now Pat. No. 11,964,251.

(30) Foreign Application Priority Data

Apr. 26, 2019 (JP) ................. 2019-084932

(51) Int. Cl.
*B01J 19/08* (2006.01)
*B01J 19/00* (2006.01)
(Continued)

(52) U.S. Cl.
CPC ......... *B01J 19/088* (2013.01); *B01J 19/0013* (2013.01); *C01B 3/047* (2013.01);
(Continued)

(58) Field of Classification Search
CPC ............... B01J 19/088; B01J 19/0013; B01J 2219/0801; B01J 2219/0896;
(Continued)

(56) References Cited

U.S. PATENT DOCUMENTS

2012/0004830 A1    1/2012   Miyagawa et al.

FOREIGN PATENT DOCUMENTS

CN         102216588 A  * 10/2011   ......... B01D 53/9436
CN         102362058 A     2/2012
(Continued)

*Primary Examiner* — Lindsay M Low
*Assistant Examiner* — Charles J Brauch
(74) *Attorney, Agent, or Firm* — KENEALY VAIDYA LLP (57) ABSTRACT

Provided is a fuel-reforming device comprising: an ammonia tank (4); a reformer (5) for reforming ammonia and generating high-concentration hydrogen gas having a hydrogen content of at least 99%; a mixing tank (7) for mixing ammonia and hydrogen for temporary storage; and a control means (10) for controlling the respective supply amounts of ammonia and high-concentration hydrogen gas that are supplied to the mixing tank (7). The control means (10) calculates the combustion rate coefficient C of mixed gas with respect to a reference fuel on the basis of equation (1). Equation (1): $S_0 = S_H \times C + S_A \times (1-C)$. In equation (1), $S_0$ is the combustion rate of the reference fuel, $S_H$ is the combustion rate of hydrogen, $S_A$ is the combustion rate of ammonia, and C is the combustion rate coefficient of mixed gas. In addition, on the basis of equation (2), the control means (10) determines the volume fractions of ammonia and hydrogen that are supplied to the mixing tank. Equation (2): $C = 1 - \exp$
(Continued)

(−A×$M_B$). In equation (2), M is the volume fraction of hydrogen in mixed gas, and A and B are constants.

15 Claims, 4 Drawing Sheets (51) Int. Cl.
| | | |
|---|---|---|
| *C01B 3/04* | (2006.01) | |
| *C01B 3/50* | (2006.01) | |
| *F02D 19/02* | (2006.01) | |
| *F02M 21/02* | (2006.01) | |
| *F02M 21/04* | (2006.01) | |
| *F02M 27/04* | (2006.01) | |

(52) U.S. Cl.
CPC ............ *C01B 3/501* (2013.01); *F02D 19/021* (2013.01); *F02M 21/0209* (2013.01); *F02M 21/0224* (2013.01); *F02M 21/023* (2013.01); *F02M 21/04* (2013.01); *F02M 27/04* (2013.01); *B01J 2219/0801* (2013.01); *B01J 2219/0896* (2013.01)

(58) Field of Classification Search
CPC .... B01J 2208/00725; B01J 2219/00243; B01J 7/00; B01J 8/001; B01J 12/002; B01J 12/007; B01J 19/0006; C01B 3/047; C01B 3/501; C01B 2203/041; C01B 2203/0861; C01B 2203/169; C01B 3/56; F02D 19/021; F02D 19/0644; F02D 19/0671; F02D 19/081; F02D 35/028; F02D 19/022; F02M 21/0209; F02M 21/0224; F02M 21/023; F02M 21/04; F02M 27/04; F02M 21/02; F02M 21/0206; F02M 27/042; Y02E 60/36

See application file for complete search history.

(56) References Cited

FOREIGN PATENT DOCUMENTS

| | | | |
|---|---|---|---|
| CN | 104675580 A | 6/2015 | |
| JP | H05-332152 A | 12/1993 | |
| JP | H07-133731 A | 5/1995 | |
| JP | 2009-097421 A | 5/2009 | |
| JP | 2009-97422 A | 5/2009 | |
| JP | 2009-221086 A | 10/2009 | |
| JP | 2010-121509 A | 6/2010 | |
| JP | 5049947 B2 | 7/2012 | |
| JP | 2018-156832 A | 10/2018 | |
| WO | WO-2013119281 A1 * | 8/2013 | ............ B01J 12/005 |
| WO | WO-2018235059 A1 * | 12/2018 | .............. B01J 19/08 |

\* cited by examiner

FUEL-REFORMING DEVICE AND FUEL-REFORMING METHOD

This application is a continuation of and claims the priority benefit under 35 U.S.C. § 120 of U.S. patent application Ser. No. 17/603,891 filed on Oct. 14, 2021 which in turn is a National Stage application filed under 35 U.S.C. § 371 of PCT Application No. PCT/JP2020/015914 filed on Apr. 9, 2020, which claims priority under 35 U.S.C. § 119 to JP2019-084932 filed in Japan on Apr. 26, 2019, which are all hereby incorporated in their entireties by reference.

TECHNICAL FIELD

The present invention relates to a fuel-reforming device that generates hydrogen by decomposing ammonia and supplies a gas containing ammonia and hydrogen as fuel, and a fuel-reforming method using this fuel-reforming device.

BACKGROUND ART

The use of hydrogen energy is pursued in order to reduce carbon dioxide emissions. However, production and transportation of hydrogen is still costly, and power generation by fuel cells using hydrogen as fuel is still more expensive than power generation using other kinds of energy. These economical constraints constitute a factor that impede the spread of hydrogen energy.

In response to this, the use of hydrogen as fuel in combustion devices such as gas engines, gas turbines, diesel engines, and gasoline engines, which have a cheaper power generation output price than fuel cells, is being considered. However, since hydrogen has a very high maximum combustion rate and high heating value, applying hydrogen on its own or a mixture of hydrogen and air to a combustion device comes with a multitude of problems.

For example, when applying hydrogen to an engine, the occurrence of backfiring becomes a problem. Backfiring is a phenomenon that mainly occurs in reciprocating engines, in which the hydrogen contacts hot components of the combustion device during the fuel intake step and ignites, exploding before ignition by the ignition plug. Patent Document 1 discloses a technique for avoiding backfiring, wherein during low-output operation, hydrogen and air are mixed in advance inside or outside the combustion chamber to generate a pre-mixed air-fuel mixture, and this pre-mixed air-fuel mixture is ignited and combusted by an ignition plug to obtain output power, and during high-output operation, hydrogen is injected at a high pressure into the already ignited pre-mixed air-fuel mixture and is ignited and combusted using the pre-mixed air-fuel mixture as an ignition source to obtain output power. However, it has been pointed out that when mixing hydrogen in gas form with air in the intake step, the volumetric efficiency of the engine decreases, resulting in a decrease in output power.

Thus, attempts are being made to mix ammonia and hydrogen and combust the mixture for use as an energy source. Since ammonia has poor ignitability and a maximum combustion rate that is 1/50 of that of hydrogen, pre-mixing hydrogen with ammonia and air in respectively appropriate proportions allows for improving ignitability and adjusting combustion rate. In addition, by adjusting an optimal mixing ratio of ammonia/hydrogen/air with respect to loads such as gas engines and gas turbines, diesel engines, and gasoline engines, etc., energy efficiency can be maximized.

Patent Document 2 discloses a technique for increasing flexibility of combustion control in an engine system in which ammonia and hydrogen are combusted. The engine system of Patent Document 2 partially reforms ammonia gas by a fuel reformer to generate hydrogen gas, and separates the ammonia and hydrogen through liquefaction by pressurization. Then, by injecting the ammonia and the hydrogen into an intake pipe with injectors connected to separate paths and combusting the ammonia and the hydrogen, flexibility of control is increased. In Patent Document 2, ammonia gas supplied into a cavity of the reformer is reformed into ammonia gas and hydrogen gas by providing microwaves from an electromagnetic wave-generating power supply to the cavity to cause a plasma discharge. The proportion of the ammonia gas to be reformed into hydrogen gas is controlled by controlling the power of the provided microwaves.

Patent Document 3 discloses an ammonia engine using hydrogen as a combustion improver. The ammonia engine of Patent Document 3 uses an ammonia cracking catalyst that cracks ammonia to generate hydrogen, which is used to aid combustion of the ammonia. Because the ammonia cracking catalyst needs to be maintained at a temperature of 290° C. or above, the ammonia engine of Patent Document 3 includes an ammonia oxidizing device that causes a reaction of ammonia with oxygen to generate heat.

RELATED ART DOCUMENTS

Patent Documents

Patent Document 1: Japanese Unexamined Patent Publication No. H7-133731
Patent Document 2: Japanese Unexamined Patent Publication No. 2009-97421
Patent Document 3: Japanese Unexamined Patent Publication No. 2010-121509

SUMMARY OF THE INVENTION

Problems to be Solved by the Invention

When supplying gas containing ammonia and hydrogen as fuel to a combustion device, there is a need to optimize the supply amount and the mixing ratio of ammonia and hydrogen according to operating conditions of the combustion device. However, with conventional reformers, it was difficult to precisely manage the proportion of hydrogen generated from ammonia, which made it difficult to optimize the fuel. It was particularly difficult to provide fuel of an optimal composition during startup or low-load operation of the combustion device.

The present invention was made in view of the aforementioned current situation, and has an object of providing a fuel-reforming device and fuel-reforming method capable of optimizing a mixing ratio and a supply amount of ammonia and hydrogen and provide them as fuel to a combustion device.

Means for Solving the Problems

The present invention relates to a fuel-reforming device to supply a fuel gas containing ammonia and hydrogen to a combustion device. The fuel-reforming device includes an ammonia tank; a reformer configured to reform ammonia and generate high-concentration hydrogen gas having a hydrogen content of 99% or more; a mixing tank configured to mix ammonia and hydrogen for temporary storage; and a control means configured to control respective supply amounts of ammonia and the high-concentration hydrogen gas that are supplied to the mixing tank. The control means of the fuel-reforming device according to the present invention stores combustion rates of a reference fuel used in the combustion device, hydrogen, and ammonia, and calculates a combustion rate coefficient C of the mixed gas with respect to the reference fuel on the basis of equation (1).
[Math 1]

$$S_0 = S_H \times C + S_A \times (1-C) \quad \text{Equation (1)}$$

Here, $S_0$ is the combustion rate of the reference fuel, $S_H$ is the combustion rate of hydrogen, $S_A$ is the combustion rate of ammonia, and C is the combustion rate coefficient of the mixed gas. Further, the control means of the fuel-reforming device according to the present invention determines, on the basis of equation (2) volume fractions of ammonia and hydrogen that are supplied to the mixing tank.
[Math 2]

$$C = 1 - \exp(-A \times M^B) \quad \text{Equation (2)}$$

Here, M is the volume fraction of hydrogen in mixed gas, and A and B are constants.

The inventors discovered the relation of the above equation (2) between the combustion rate coefficient C, which is a ratio of the combustion rate of the mixed gas with respect to the combustion rate of the reference fuel, and the volume fraction M of hydrogen, and ultimately optimized the mixing ratio of the mixed gas. Further, the control means of the fuel-reforming device according to the present invention stores high heating values of the reference fuel used in the combustion device, hydrogen, and ammonia, and, based on the ratio of the high heating value of the mixed gas with respect to the high heating value of the reference fuel, determines a flow rate fraction of a supply amount of the mixed gas with respect to the reference fuel on the basis of equation (3) and equation (4).
[Math 3]

$$H_m = H_H \times M + H_A \times (1-M) \quad \text{Equation (3)}$$

$$W_m = H_m / H_0 \quad \text{Equation (4)}$$

Here, $H_m$ is the high heating value of the mixed gas, $H_H$ is the high heating value of hydrogen, $H_A$ is the high heating value of ammonia, $H_0$ is the high heating value of the reference fuel, and $W_m$ is a flow rate fraction by weight of the mixed gas with respect to the reference fuel.

The control means receives a fuel request speed of reference fuel from the combustion device, and can determine a supply amount of the mixed gas to be supplied from the mixing tank to the combustion device on the basis of equation (5) and equation (6).
[Math 4]

$$m_w = 2 \times M + 17 \times (1-M) \quad \text{Equation (5)}$$

$$F_m = (W_0 \times W_m \times 1000)/m_w \times 22.4 \quad \text{Equation (6)}$$

Here, $m_w$ is a molecular weight of mixed fuel, $W_0$ is the fuel request speed of reference fuel requested by the combustion device, and $F_m$ is a supply amount of mixed gas to be supplied to the combustion device.

The reformer of the fuel-reforming device according to the present invention preferably includes a plasma reactor vessel for decomposing ammonia and turning it into plasma; a plasma generating power supply; and a hydrogen separation membrane arranged inside the plasma reactor vessel, the hydrogen separation membrane separating hydrogen from the plasma of ammonia and transmitting the hydrogen as a high-concentration hydrogen gas to an outlet on the mixing tank side. The control means of the fuel-reforming device according to the present invention can control a voltage of the plasma generating power supply and an ammonia flow rate from the ammonia tank to control a generation amount of the high-concentration hydrogen gas.

The fuel-reforming device according to the present invention may further include an ammonia decomposition catalyst reactor that decomposes part of the ammonia to generate a low-concentration hydrogen gas having a hydrogen content of 5 to 15%; and a low-concentration hydrogen tank that temporarily stores the generated low-concentration hydrogen gas and supplies the low-concentration hydrogen gas to the mixing tank. The control means of the fuel-reforming device including the ammonia decomposition catalyst reactor determines a mixing fraction MH on a volume basis of high-concentration hydrogen gas to be supplied from the reformer to the mixing tank on the basis of the equation $M_H = (100 \times M - H_{2L})/(100 - H_{2L})$. Here, $H_{2L}$ is a hydrogen concentration (percent by volume, $N_2$-free basis) of gas in the low-concentration tank, and M is the volume fraction of hydrogen in mixed gas.

The control means of the fuel-reforming device according to the present invention controls a first valve that controls a supply amount of ammonia supplied from the ammonia tank to the reformer, a second valve that controls a supply amount of ammonia supplied from the ammonia tank to the ammonia decomposition catalyst reactor, a third valve that controls a supply amount of the low-concentration hydrogen gas supplied from the low-concentration hydrogen tank to the mixing tank, a voltage of a high-voltage power supply that supplies power to the reformer, a supply amount of power supplied to the ammonia decomposition catalyst reactor, and a supply amount of mixed gas to be supplied to the combustion device.

The present invention also provides a fuel-reforming method of supplying a fuel gas containing ammonia and hydrogen to a combustion device. The fuel-reforming method according to the present invention includes a step of determining mixing fractions of ammonia and hydrogen; a step of reforming ammonia by a reformer to generate a high-concentration hydrogen gas having a hydrogen content of 99% or more; a step of mixing ammonia and the high-concentration hydrogen gas to make a mixed gas; and a step of supplying the mixed gas to the combustion device. The step of determining the mixing fractions of ammonia and hydrogen according to the present invention includes calculating, based on combustion rates of a reference fuel used in the combustion device, hydrogen, and ammonia, a combustion rate coefficient C of the mixed gas with respect to the reference fuel on the basis of equation (1).
[Math 5]

$$S_0 = S_H \times C + S_A \times (1-C) \quad \text{Equation (1)}$$

Here, $S_0$ is the combustion rate of the reference fuel, $S_H$ is the combustion rate of hydrogen, $S_A$ is the combustion rate of ammonia, and C is the combustion rate coefficient of the mixed gas. In addition, the fuel-reforming method according to the present invention determines, on the basis of equation (2) a volume fraction of hydrogen that is supplied to the mixing tank.

[Math 6]

$$C = 1 - \exp(-A \times M^B) \qquad \text{Equation (2)}$$

Here, M is the volume fraction of hydrogen in the mixed gas, A and B are constants, and the mixing ratio of ammonia and the high-concentration hydrogen gas is controlled to be (1–M):M.

Effects of the Invention

The fuel-reforming device and fuel-reforming method of the present invention produces a high-concentration hydrogen gas with a hydrogen content of 99% or more from ammonia and mixes it with ammonia as fuel, and can thus easily optimize the mixing ratio of hydrogen and ammonia. This allows for easy optimization of combustion in the combustion device to be supplied.

The fuel-reforming device and fuel-reforming method of the present invention may contribute to a reduction of NOx emissions during combustion in order to enable optimization of the combustion device.

The fuel-reforming device and fuel-reforming method of the present invention are capable of performing highly precise combustion extremely easily, by quantifying and controlling the volume fractions when mixing ammonia and hydrogen in relation to a combustion rate coefficient of the mixed gas with respect to a reference fuel.

The fuel-reforming device of the present invention is capable of maximizing production of fuel by using high-concentration hydrogen gas generated by the reformer and low-concentration hydrogen gas generated by the ammonia decomposition catalyst reactor in combination, and can thus be adapted for a large combustion device.

The fuel-reforming device and fuel-reforming method of the present invention can maximize energy efficiency with respect to combustion devices such as gas engines and gas turbines, diesel engines, and gasoline engines, etc. by adjusting fuel to an optimal mixing ratio of ammonia/hydrogen/air and supplying the fuel.

The fuel-reforming device and fuel-reforming method of the present invention can maximize energy efficiency with respect to a power generation load by adjusting fuel to an optimal mixing ratio ammonia/hydrogen/air and supplying the fuel.

EMBODIMENTS FOR CARRYING OUT THE INVENTION

Figure 1:
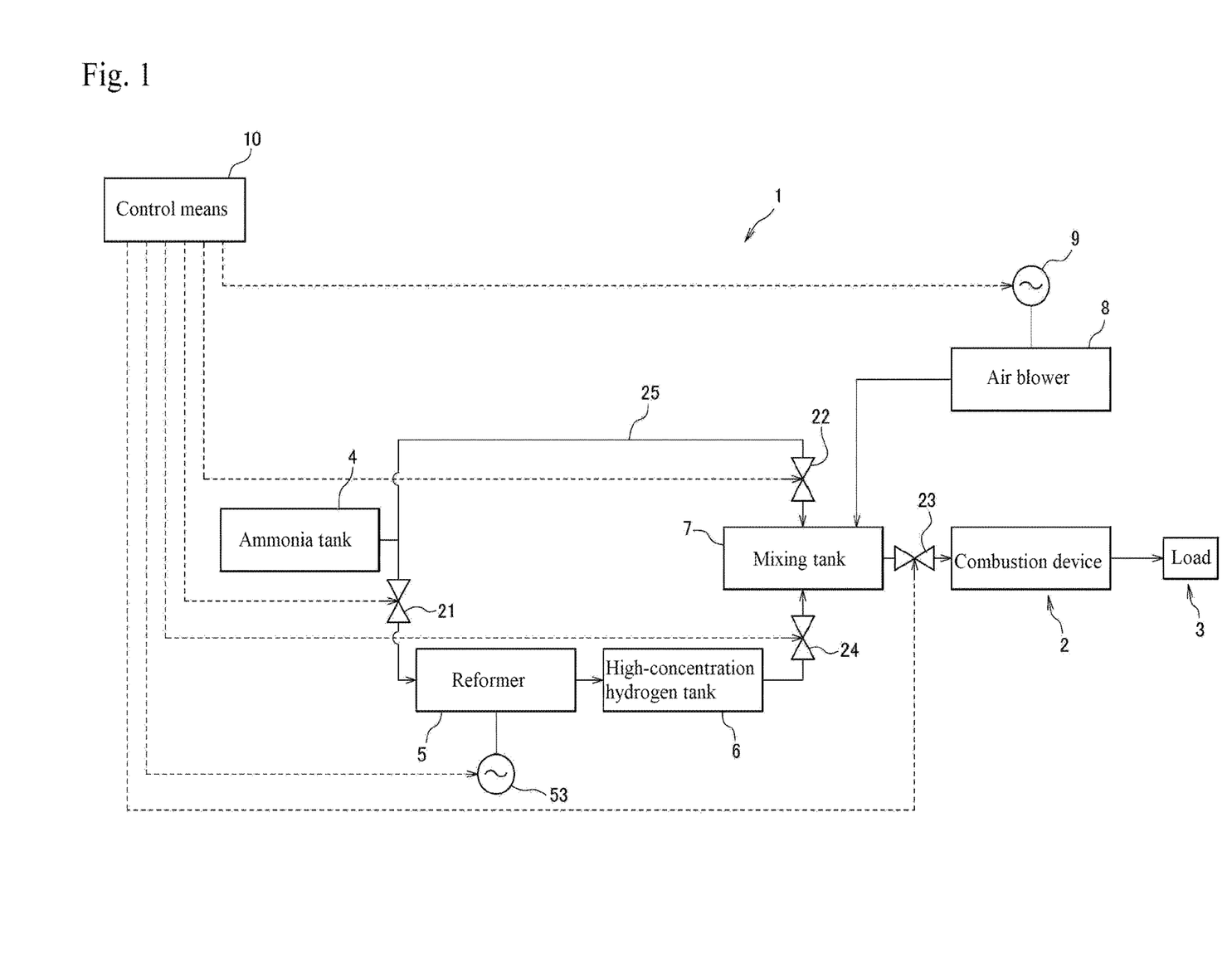
FIG. 1 is a block diagram schematically showing a configuration of a fuel-reforming device according to an embodiment of the present invention.

FIG. 1 schematically shows a fuel-reforming device 1 according to an embodiment of the present invention. The fuel-reforming device 1 supplies a mixed gas containing ammonia and hydrogen as fuel to a combustion device 2. The combustion device 2 is connected to a load 3, and changes a combustion state in response to a request from the load 3 side.

The fuel-reforming device 1 includes an ammonia tank 4, a reformer 5, and a high-concentration hydrogen tank 6. The ammonia tank 4 is connected to a mixing tank 7 via an ammonia supply path 25 to supply ammonia. Likewise, the ammonia tank 4 is also connected to the reformer 5 via a separate ammonia supply path to supply ammonia to the reformer 5. A first valve 21 is provided on the ammonia supply path connecting the ammonia tank 4 and the reformer 5, whereby the supply amount of ammonia is controlled. Likewise, a valve 22 is provided on the path connecting the ammonia tank 4 and the mixing tank 7, whereby the supply amount of ammonia is controlled.

Figure 3:
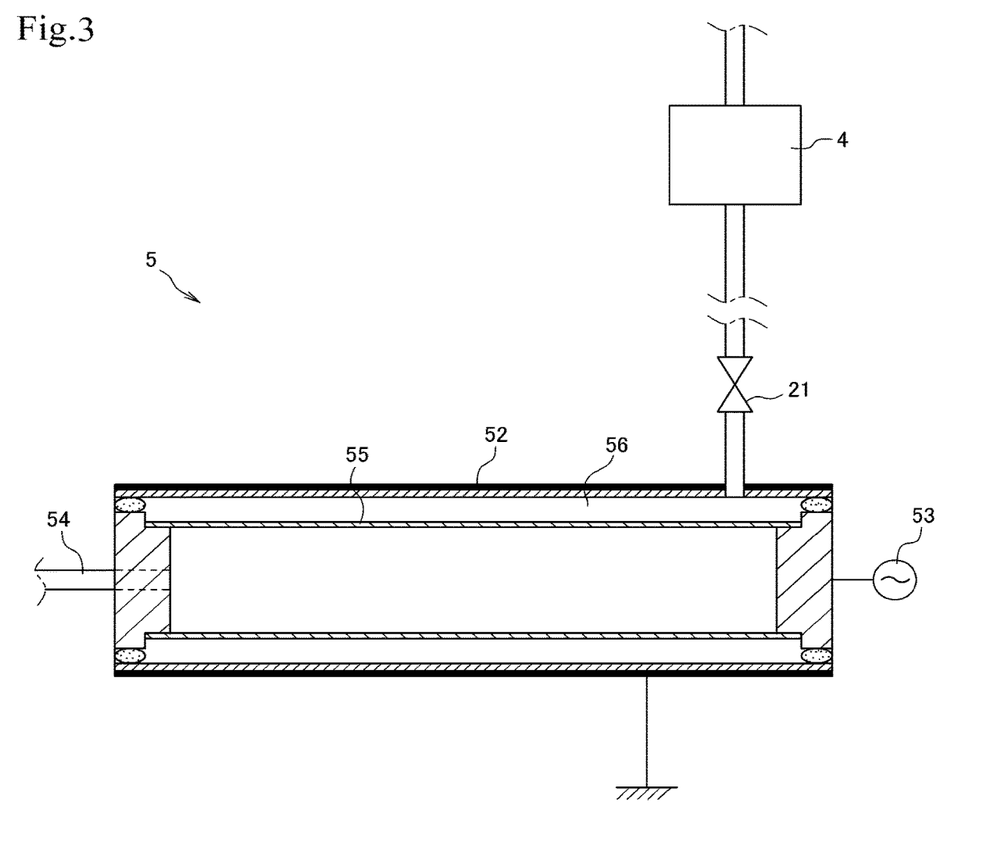
FIG. 3 shows an example of a reformer preferably applied to the fuel-reforming device of the present invention.

A preferred embodiment of the reformer 5 of the present invention is shown in FIG. 3. The reformer 5 is a device including a plasma reactor vessel 52 for decomposing ammonia and turn it into plasma, a plasma generating power supply 53, and a hydrogen separation membrane 55 that defines a hydrogen outlet 54 side of the plasma reactor vessel 52. A ground electrode not shown here is arranged in contact with the outside of the plasma reactor vessel 52. A discharge space 56 is formed between the inner surface of the plasma reactor vessel 52 and the hydrogen separation membrane 55, and ammonia supplied from the ammonia tank 4 is introduced into the discharge space 56. When a high voltage is applied to the hydrogen separation membrane 55 from the plasma generating power supply 53, a dielectric barrier discharge occurs, turning the ammonia into plasma. The hydrogen separation membrane 55 of the reformer 5 separates only hydrogen from the ammonia that has become plasma in the plasma reactor vessel 52 and transmits the hydrogen to the hydrogen outlet 54 side. By controlling both the amount of ammonia supplied to the reformer 5 and the voltage of the plasma generating power supply 53, the production amount of hydrogen can be changed easily and quickly. The hydrogen gas introduced to the hydrogen outlet 54 will be a high-purity hydrogen gas with a purity of 99% or more.

Since the reformer 5 is able to produce hydrogen immediately in response to a request from the combustion device side, the high-concentration hydrogen tank 6, which is a temporary reservoir for hydrogen, is not an essential component. However, by providing the high-concentration hydrogen tank 6 on the path from the reformer 5 to the mixing tank 7, excess hydrogen gas can be temporarily stored, allowing for reforming of ammonia to be performed more efficiently overall.

In the mixing tank 7, ammonia supplied from the ammonia tank 4, hydrogen supplied from the high-concentration hydrogen tank 6, and additionally air supplied from an air blower 8, are mixed to produce a pre-mixed mixed gas, which is stored in the mixing tank 7. The appropriate composition ratio of the mixed gas is determined by a control means 10 based on values of a combustion rate and a high heating value requested by the combustion device 2, and is managed by controlling the supply amount of ammonia and the production amount of hydrogen. The supply amount of the mixed gas to the combustion device 2 is controlled by the control means 10 according to the characteristics of the combustion device 2 and the load.

The fuel reforming performed by the control means 10 of the fuel-reforming device 1 according to the present embodiment will be described. The control means 10 controls the supply amount of ammonia supplied from the ammonia tank 4 to the reformer 5 using the valve 21, and controls the supply amount of ammonia supplied from the ammonia tank 4 to the mixing tank 7 using the valve 22. The control means 10 further controls the voltage of the power supplied to the reformer 5 to control the production amount of high-concentration hydrogen. Finally, the control means 10 controls the supply amount of mixed gas supplied from the mixing tank to the combustion device 2 by an operation of a valve 23.

Hereinafter, fuels conventionally used by the combustion device 2 are referred to as "reference fuels". Table 1 shows examples of maximum combustion rate and high heating value of standard reference fuels, ammonia, and hydrogen.

TABLE 1

| Substance | Maximum combustion rate cm/s | High heating value MJ/kg |
|---|---|---|
| Hydrogen | 346 | 141.8 |
| Ammonia | 8 | 22.5 |
| Methane | 43 | 55.5 |
| Propane | 47 | 50.4 |
| Gasoline | 42 | 47.3 |

The control means 10 stores the maximum combustion rate and high heating value of the reference fuels, hydrogen, and ammonia, and calculates a combustion rate coefficient C of the mixed gas with respect to a reference fuel based on equation (1) below.

[Math 7]

$$S_0 = S_H \times C + S_A \times (1-C) \qquad \text{Equation (1)}$$

Here, $S_0$ is the combustion rate (cm/s) of the reference fuel, $S_H$ is the combustion rate of hydrogen, and $S_A$ is the combustion rate of ammonia. According to the example shown in Table 1, $S_H$ is 346 cm/s, and is the combustion rate of hydrogen, and $S_A$ is 8 cm/s. Using this equation, the control means 10 calculates the combustion rate coefficient C of the mixed gas.

Further, based on equation (2), the control means 10 determines the volume fractions of ammonia and hydrogen that are supplied to the mixing tank. The calculation of the volume fractions uses equation (2) below to first determine the mixing fraction M of hydrogen on a volume basis.

[Math 8]

$$C = 1 - \exp(-A \times M^B) \qquad \text{Equation (2)}$$

Here, A and B are constants, the most preferable values of which are A=6.0 and B=3.5.

Having determined the mixing fraction M of hydrogen on a volume basis, the mixing fraction of ammonia on a volume basis becomes 1−M.

Having determined the mixing fractions of hydrogen and ammonia, the control means 10, by an open/close operation of the valve 22 and a valve 24, supplies hydrogen and ammonia in the determined volume fraction to the mixing tank 7 for mixing.

Next the control means 10 determines a flow rate of the mixed gas to supply to the combustion device 2. The control means 10 stores the high heating value of the reference fuel, hydrogen, and ammonia in advance, and first uses equation (3) and equation (4) to determine a flow rate fraction $W_m$ of the supply amount of the mixed gas with respect to the reference fuel. Equation (3) is used to determine a high heating value $H_m$ of the mixed gas. In equation (3), $H_H$ is the high heating value of hydrogen gas, $H_A$ is the high heating value of ammonia, and M is the mixing fraction of hydrogen on a volume basis.

[Math 9]

$$H_m = H_H \times M + H_A \times (1-M) \qquad \text{Equation (3)}$$

As shown in Table 1, the high heating value of hydrogen is 141.8 MJ/kg, and the high heating value of ammonia is 22.5 MJ/kg. Accordingly, equation (3) is expressed the following way.

[Math 10]

$$H_m = 141.8 \times M + 22.5 \times (1-M) \qquad \text{Equation (3')}$$

Next, the control means 10 uses equation (4) to determine the flow rate fraction $W_m$ of the mixed gas with respect to the reference fuel from the ratio of the high heating value $H_m$ of the mixed gas relative to the high heating value $H_0$ of the reference fuel.

[Math 11]

$$W_m = H_m/H_0 \qquad \text{Equation (4)}$$

Further, the control means 10 calculates the molecular weight $m_w$ of the mixed fuel using equation (5). In equation (5), the coefficient 2 of the mixing fraction M of the hydrogen is the mass number of the hydrogen, and the coefficient 17 of the mixing fraction (1-M) of the ammonia is the mass number of the ammonia.

[Math 12]

$$m_w = 2 \times M + 17 \times (1-M) \qquad \text{Equation (5)}$$

Then, when a fuel request speed $W_0$ (kg/h) of the reference fuel is input from the combustion device 2, the control means 10 substitutes the flow rate fraction $W_m$ of the mixed gas and the molecular weight $m_w$ of the mixed fuel calculated in equation (4) into equation (6) to determine a supply amount $F_m$(NL/h) of mixed gas to supply from the mixing tank to the combustion device 2.

[Math 13]

$$F_m = (W_0 \times W_m \times 1000)/m_w \times 22.4 \qquad \text{Equation (6)}$$

By controlling the amount of ammonia and hydrogen to supply to the mixing tank 7 with the flow rate (NL/h), the control means 10 is able to maintain a constant mixing ratio of ammonia and hydrogen in the mixing tank 7. The flow rate $F_{H2}$(NL/h) of hydrogen supplied to the mixing tank 7 is controlled using equation (7) below. In addition, the flow rate $F_{NH3}$(NL/h) of ammonia supplied to the mixing tank 7 is controlled using equation (8) below.

[Math 14]

$$F_{H2} = F_m \times M \quad \text{Equation (7)}$$

$$F_{NH3} = F_m \times (1-M) \quad \text{Equation (8)}$$

Figure 2:
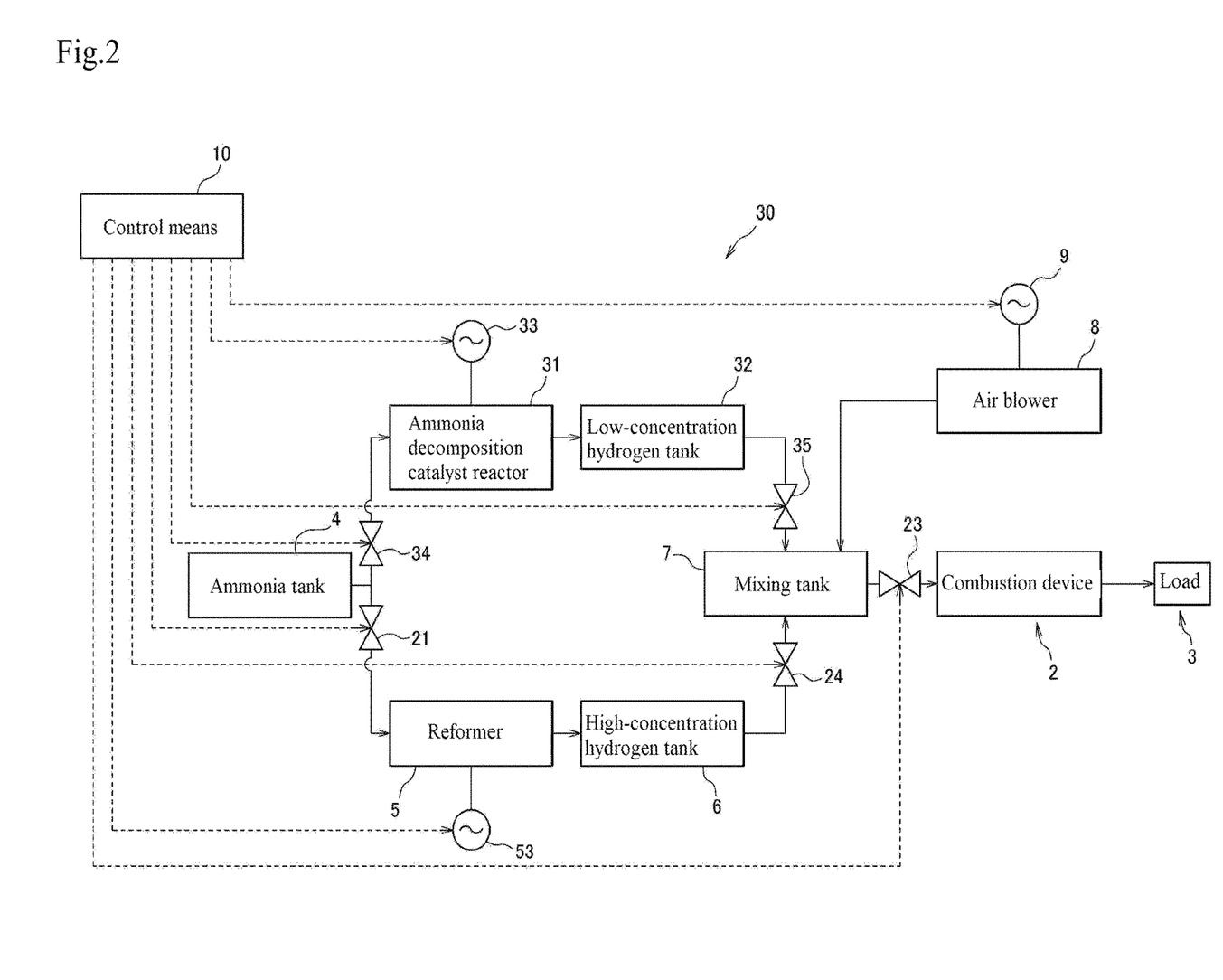
FIG. 2 is a block diagram schematically showing a configuration of a second embodiment of the fuel-reforming device of the present invention.

FIG. 2 shows a further embodiment of the fuel-reforming device of the present invention. A fuel-reforming device 30 further includes an ammonia decomposition catalyst reactor 31, and a low-concentration hydrogen tank 32. The ammonia decomposition catalyst reactor 31 decomposes part of the ammonia supplied from the ammonia tank 4 to generate low-concentration hydrogen gas with a hydrogen content of 5 to 15%, a nitrogen content of 1.7 to 5%, and an ammonia content of 80 to 93%, and delivers the low-concentration hydrogen gas to the low-concentration hydrogen tank 32.

Figure 4:
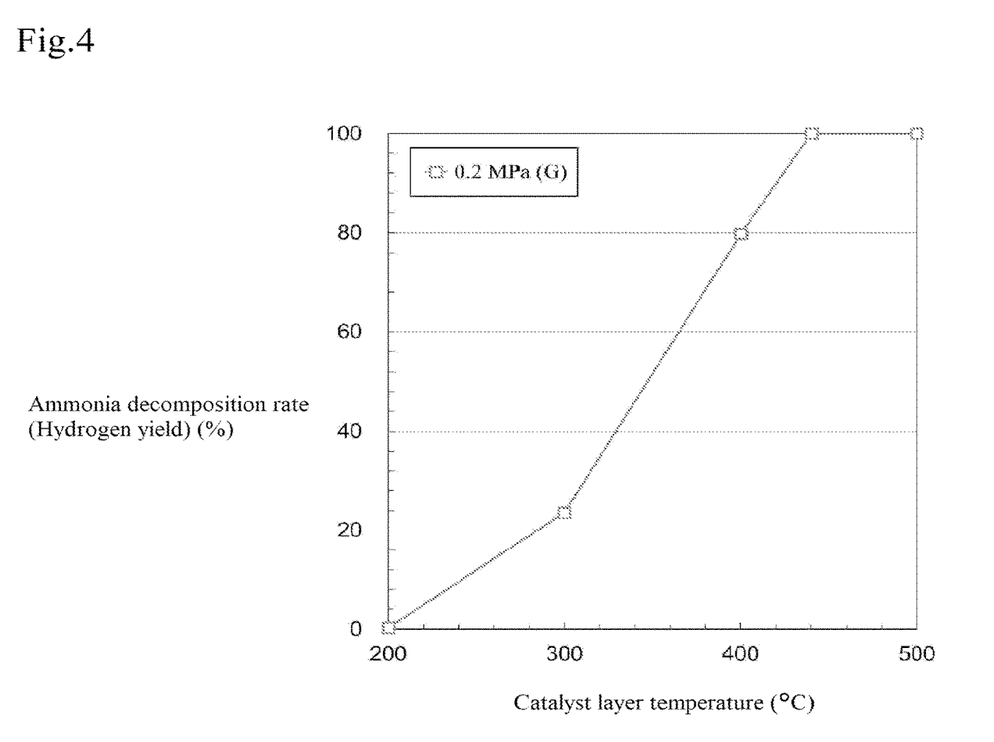
FIG. 4 shows a relation between a catalyst layer temperature of an ammonium decomposition catalyst reactor of the present invention and an ammonium decomposition rate.

In addition to controlling the reformer 5, the control means 10 performs control of the ammonia decomposition catalyst reactor 31 to control the composition and generated amount of low-concentration hydrogen gas. The ammonia decomposition catalyst reactor 31 is able to control the decomposition rate of the ammonia by controlling a reaction temperature as exemplarily shown in FIG. 4. Taking ease of the temperature control of the ammonia decomposition catalyst reactor 31 into consideration, the low-concentration hydrogen gas is preferably controlled to have a hydrogen content of 5 to 15%. The control means 10 controls the properties of the low-concentration hydrogen gas by controlling the power supplied by a power supply 33 of the ammonia decomposition catalyst reactor 31. $Ru/Al_2O_3$ is preferably applied as the ammonia decomposition catalyst.

In the fuel-reforming device 30 according to the present embodiment, low-concentration hydrogen gas supplied from the low-concentration hydrogen tank 32, hydrogen supplied from the high-concentration hydrogen tank 6, and additionally air supplied from the air blower 8, are appropriately mixed in the mixing tank 7 to produce mixed gas, which is stored in the mixing tank 7.

At this time, the control means 10 determines the amount of low-concentration hydrogen gas and high-concentration hydrogen gas supplied to the mixing tank 7 based on the already calculated mixing fraction M on a volume basis of the hydrogen and the flow rate $F_{H2}$(NL/h) of the hydrogen supplied to the mixing tank 7, using equations (9) to (12) below. Using equation (9), the mixing fraction (on a volume basis) $M_H$ of the high-concentration hydrogen tank 6 can be calculated.

[Math 15]

$$M_H = (100 \times M - H_{2L})/(100 - H_{2L}) \quad \text{Equation (9)}$$

Here, $H_{2L}$ is the hydrogen concentration (percent by volume, $N_2$-free basis) of gas in the low-concentration tank.

Next, using equation (10), it is here possible to determine the flow rate $F_{HT}$(NL/h) of high-concentration hydrogen gas supplied to the mixing tank 7.

[Math 16]

$$F_{HT} = F_m \times M_H \quad \text{Equation (10)}$$

Using equation (11), it is possible to determine the flow rate $F_{LT}$(NL/h) of ammonia gas supplied to the mixing tank 7.

[Math 17]

$$F_{LT} = F_m' \times (1-M_H) \quad \text{Equation (11)}$$

Here, $F_m'$ is the fuel supply rate (NL/h, $N_2$-inclusive basis) of mixed gas supplied to the combustion device.

Using equation (12), it is possible to determine the fuel supply rate $F_m'$(NL/h, $N_2$-inclusive basis) of mixed gas supplied to the combustion device 2.

[Math 18]

$$F_m' = F_m \times 100/(100 - N_{2L}) \quad \text{Equation (12)}$$

Here, $N_{2L}$ is the nitrogen concentration (percent by volume) of the gas in the low-concentration tank.

EXAMPLES

Example 1

An example is shown wherein the fuel-reforming device 1 according to the present invention was applied to produce fuel for a combustion device where the reference fuel is methane, the fuel supply rate is W0=1.0 kg/h and the power generation amount is 1000 Wh.

The control means 10 stores 43 cm/s as the maximum combustion rate of methane, and also stores 346 cm/s as the maximum combustion rate of hydrogen and 8 cm/s as the maximum combustion rate of ammonia. Based on these maximum combustion rates, the combustion rate coefficient C of the mixed gas calculated using equation (1) is 0.104. Substituting the combustion rate coefficient C into equation (2) and calculating the volume fraction M occupied by hydrogen in the mixed gas, the volume fraction is 0.319. Accordingly, the volume fraction of ammonia is 0.681. The mixing tank 7 was supplied with high-concentration hydrogen produced by the reformer 5 and with ammonia from the ammonia tank, and these were mixed. Calculating the high heating value $H_m$ of the mixed gas at this time based on equation (3), it was found to be 141.8×0.319+22.5× 0.681=60.6. Meanwhile, the high heating value $H_0$ of the reference gas methane is 55.5. By applying these values to equation (4), the flow rate fraction $W_m$ by weight of the mixed gas with respect to the reference fuel was calculated as 0.917. Meanwhile, since the molecular weight $m_w$ of the mixed gas was 12.2, the fuel supply rate $F_m$ of the mixed gas could be determined to be 28.0 NL/h by using equation (6). In addition, in order to maintain the fuel supply rate $F_m$ at 28.0 NL/h, the supply amount of hydrogen supplied to the mixing tank was determined using equation (7) to be 8.9 NL/h. Similarly, the supply amount of ammonia supplied to the mixing tank was determined using equation (8) to be 19.1 NL/h. By supplying the mixed gas with a hydrogen-to-ammonia volume ratio controlled by the control means 10 to be 0.319:0.681 at a rate of 28.0 NL/h, the combustion device 2 achieved desirable combustion.

Example 2

Next, an example is shown wherein the fuel-reforming device 30 according to the present invention was applied to produce fuel for a combustion device like in Example 1, where the reference fuel is methane, the fuel supply rate is W0=1.0 kg/h and the power generation amount is 1000 Wh. In the present Example, the hydrogen concentration $H_{2L}$ of the low-concentration hydrogen gas produced by the ammonia decomposition catalyst reactor 31 is 7.7 vol %.

The control means 10, like in Example 1, stores the maximum combustion rates and high heating values of methane, hydrogen, and ammonia. Then, by using equations (1) to (6), it was determined that the fuel supply rate Fm of the mixed gas was 28.0 NL/h, and the mixing fraction of hydrogen was 0.319. Further, the control means 10 used equation (9) to determine the mixing fraction (on a volume basis) $M_H$ of the high-concentration hydrogen tank 6 to be 0.262. As a result, the supply amount of hydrogen supplied from the high-concentration hydrogen tank 6 to the mixing tank 7 was determined using equation (10) to be 7.3 NL/h.

In order to generate 7.3 NL/h of hydrogen by the reformer 5 and supplying the hydrogen to the mixing tank 7, the control means 10 supplied 24.2 l/min of ammonia from the ammonia tank 4 to the reformer 5. Then, a voltage of 20 kV was supplied to the reformer 5 to produce hydrogen. At this time, the concentration of hydrogen gas supplied from the reformer 5 to the high-concentration hydrogen tank 6 was 99.999%, almost pure hydrogen.

The control means 10 determined the supply amount of low-concentration hydrogen gas supplied to the mixing tank 7 to be 2.12 NL/h using equations (11) and (12). In order to generate the low-concentration hydrogen gas, the control means 10 set the reaction temperature of the ammonia decomposition catalyst reactor to 250° C., and supplied 19.3 l/min of ammonia. At this time, a gas composed of 7.5% of hydrogen, 90% of ammonia, and 2.5% of nitrogen was generated by the ammonia decomposition catalyst reactor 31 at a rate of 2.12 NL/h. Because the control means 10 supplied 7.3 NL/h of hydrogen gas from the high-concentration hydrogen tank 6 to the mixing tank, and simultaneously supplied 2.12 NL/h of low-concentration hydrogen gas from the low-concentration hydrogen tank to the mixing tank, the gas inside the mixing tank was maintained at 31.8% of hydrogen, 66.4% of ammonia, and 1.8% of nitrogen. By supplying the gas from the mixing tank as fuel gas to the combustion device 2 at a rate of 28.5 l/min, the combustion device 2 could maintain a desired combustion.

Example 3

An example is shown wherein the fuel-reforming device 30 was applied to produce fuel for a methane gas engine. The control means 10 set the temperature of the ammonia decomposition catalyst reactor to 250° C. to produce a low-concentration hydrogen mixed gas with an ammonia decomposition rate of 10% and stored the gas in the low-concentration hydrogen tank 32. The composition of the generated low-concentration hydrogen mixed gas was 7.5% of hydrogen, 90% of ammonia, and 2.5% of nitrogen. Next, the reformer 5 generated hydrogen gas with 99% hydrogen content and stored the gas in the high-concentration hydrogen tank 6. Then, 73.8% of low-concentration hydrogen gas and 26.2% of high-concentration hydrogen gas were mixed and stored in the mixing tank 7. The maximum combustion rate of this mixed fuel was 43 cm/s, matching the maximum combustion rate of methane. In addition, since the high heating value of this mixed fuel was 61 MJ/kg, exceeding the high heating value 55.5 MJ/kg of methane, the flow rate of the valve 23 was controlled so that the flow rate of mixed fuel to the methane gas engine was multiplied by 0.92. This allowed the combustion device 2 to achieve desired combustion.

While the fuel-reforming device and fuel-reforming method according to the present invention have been described based on the above Examples, the invention according to the scope of claims is not limited to these Examples, and the configuration of the fuel-reforming device may be appropriately modified. For example, as already described, the high-concentration hydrogen tank is not essential, and it is possible to supply high-concentration hydrogen gas directly from the reformer to the mixing tank. The contents of the control by the control means may be changed on a per second basis in response to the combustion characteristics of the combustion device 2.

DESCRIPTION OF THE REFERENCE NUMERAL 1, 30 Fuel-reforming device
2 Combustion device
3 Load
4 Ammonia tank
5 Reformer
6 High-concentration hydrogen tank
7 Mixing tank
8 Air blower
10 Control means

The invention claimed is:

1. A fuel-reforming device to supply a fuel gas containing ammonia and hydrogen to a combustion device, the fuel-reforming device comprising:
    an ammonia tank;
    a reformer configured to reform ammonia and generate high-concentration hydrogen gas;
    a mixing tank configured to temporarily store a mixed gas and supply the mixed gas as a fuel gas to the combustion device, the mixed gas being a mixture of ammonia supplied from the ammonia tank via a first ammonia supply path and the high-concentration hydrogen gas generated in the reformer by reforming ammonia supplied from the ammonia tank to the reformer via a second ammonia supply path separated from the first ammonia supply path; and
    a controller configured to control respective supply amounts of the ammonia and the high-concentration hydrogen gas to be supplied to the mixing tank, and to control an amount of the mixed gas to be delivered to the combustion device, based on values of a combustion rate and a high heating value requested by the combustion device.

2. The fuel-reforming device according to claim 1, further comprising:
    a high-concentration hydrogen tank disposed between the reformer and the mixing tank.

3. The fuel-reforming device according to claim 1, wherein the reformer includes:
    a plasma reactor vessel configured to decompose the ammonia and turning it into plasma;
    a plasma generating power supply; and a hydrogen separation membrane arranged inside the plasma reactor vessel, the hydrogen separation membrane being configured to separate hydrogen from the plasma of the ammonia and to transmit the hydrogen as the high-concentration hydrogen gas to an outlet on the mixing tank side, wherein the controller is configured to control a voltage of the plasma generating power supply and an ammonia flow rate from the ammonia tank so as to control a generation amount of the high-concentration hydrogen gas.

4. The fuel-reforming device according to claim 1, wherein the controller is configured to store combustion rates of a reference fuel used in the combustion device, hydrogen, and ammonia, and to calculate a combustion rate coefficient C of the mixed gas with respect to the reference fuel on the basis of equation (1)

$$S_0 = S_H \times C + S_A \times (1-C) \quad \text{Equation (1)}$$

wherein $S_0$ is the combustion rate of the reference fuel, $S_H$ is the combustion rate of hydrogen, $S_A$ is the combustion rate of ammonia, and C is the combustion rate coefficient of the mixed gas, wherein the controller is configured to determine volume fractions of the ammonia and the hydrogen to be supplied to the mixing tank on the basis of equation (2)

$$C = 1 - \exp(-A \times M^B), \text{ and} \quad \text{Equation (2):}$$

wherein M is the volume fraction of hydrogen in mixed gas, A is 6.0, and B is 3.5.

5. A fuel-reforming method for supplying a fuel gas containing ammonia and hydrogen to a combustion device, the fuel-reforming method comprising:
   determining mixing fractions of ammonia and hydrogen;
   supplying the ammonia from an ammonia tank to a mixing tank via a first ammonia supply path;
   supplying the ammonia from the ammonia tank to a reformer via a second ammonia supply path separated from the first ammonia supply path;
   reforming the ammonia supplied through the second ammonia supply path in the reformer to generate a high-concentration hydrogen gas;
   making mixed gas in the mixing tank by mixing the ammonia via the first ammonia supply path and the high-concentration hydrogen gas; and
   supplying the mixed gas to the combustion device, based on values of a combustion rate and a high heating value requested by the combustion device.

6. The fuel-reforming method according to claim 5, further comprising:
   temporarily storing the high-concentration hydrogen gas in a high-concentration hydrogen tank disposed between the reformer and the mixing tank.

7. The fuel-reforming device according to claim 1, wherein the reformer includes a hydrogen separation membrane.

8. A fuel-reforming device to supply a fuel gas containing ammonia and hydrogen to a combustion device, the fuel-reforming device comprising:
   an ammonia tank;
   a reformer configured to reform ammonia and generate high-concentration hydrogen gas;
   a mixing tank configured to temporarily store a mixed gas and supply the mixed gas as a fuel gas to the combustion device, the mixed gas being a mixture of low-concentration hydrogen gas generated by decomposing a part of ammonia supplied from the ammonia tank via a first ammonia supply path and the high-concentration hydrogen gas generated in the reformer by reforming ammonia supplied from the ammonia tank to the reformer via a second ammonia supply path separated from the first ammonia supply path; and
   a controller configured to control respective supply amounts of the low-concentration hydrogen gas and the high-concentration hydrogen gas to be supplied to the mixing tank, and to control an amount of the mixed gas to be delivered to the combustion device, based on values of a combustion rate and a high heating value requested by the combustion device.

9. The fuel-reforming device according to claim 8, further comprising:
   a high-concentration hydrogen tank disposed between the reformer and the mixing tank.

10. The fuel-reforming device according to claim 8, wherein the reformer includes:
   a plasma reactor vessel configured to decompose the ammonia and turning it into plasma;
   a plasma generating power supply; and
   a hydrogen separation membrane arranged inside the plasma reactor vessel, the hydrogen separation membrane being configured to separate hydrogen from the plasma of the ammonia and to transmit the hydrogen as the high-concentration hydrogen gas to an outlet on the mixing tank side,
   wherein the controller is configured to control a voltage of the plasma generating power supply and an ammonia flow rate from the ammonia tank so as to control a generation amount of the high-concentration hydrogen gas.

11. The fuel-reforming device according to claim 8, further comprising:
   an ammonia decomposition catalyst reactor that decomposes the ammonia to generate the low-concentration hydrogen gas; and
   a low-concentration hydrogen tank that temporarily stores the generated low-concentration hydrogen gas and supplies the low-concentration hydrogen gas to the mixing tank.

12. The fuel-reforming device according to claim 11, wherein the controller is configured to control:
   a first valve that controls a supply amount of the ammonia from the ammonia tank to the reformer;
   a second valve that controls a supply amount of the ammonia from the ammonia tank to the ammonia decomposition catalyst reactor;
   a third valve that controls a supply amount of the low-concentration hydrogen gas from the low-concentration hydrogen tank to the mixing tank;
   a voltage of a high-voltage power supply that supplies power to the reformer;
   a supply amount of power supplied to the ammonia decomposition catalyst reactor; and
   a supply amount of the mixed gas to the combustion device.

13. The fuel-reforming device according to claim 8, wherein the controller is configured to store combustion rates of a reference fuel used in the combustion device, hydrogen, and ammonia, and to calculate a combustion rate coefficient C of the mixed gas with respect to the reference fuel on the basis of equation (1)

$$S_0 = S_H \times C + S_A \times (1-C) \quad \text{Equation (1)}$$

wherein $S_0$ is the combustion rate of the reference fuel, $S_H$ is the combustion rate of hydrogen, $S_A$ is the combustion rate of ammonia, and C is the combustion rate coefficient of the mixed gas,
wherein the controller is configured to determine volume fractions of the ammonia and the hydrogen to be supplied to the mixing tank on the basis of equation (2)

$$C = 1 - \exp(-A \times M^B), \text{ and} \quad \text{Equation (2):}$$

wherein M is the volume fraction of hydrogen in mixed gas, A is 6.0, and B is 3.5.

14. A fuel-reforming method for supplying a fuel gas containing ammonia and hydrogen to a combustion device, the fuel-reforming method comprising:

determining mixing fractions of ammonia and hydrogen;
decomposing a part of ammonia supplied from an ammonia tank via a first ammonia supply path to generate low-concentration hydrogen gas;
supplying the ammonia from the ammonia tank to a reformer via a second ammonia supply path separated from the first ammonia supply path;
reforming the ammonia supplied through the second ammonia supply path in the reformer to generate a high-concentration hydrogen gas;
making mixed gas in a mixing tank by mixing the low-concentration hydrogen gas and the high-concentration hydrogen gas; and
supplying the mixed gas to the combustion device, based on values of a combustion rate and a high heating value requested by the combustion device.

15. The fuel-reforming method according to claim 14, further comprising:
temporarily storing the high-concentration hydrogen gas in a high-concentration hydrogen tank disposed between the reformer and the mixing tank.

* * * * *